United States Patent Office 3,379,461
Patented Apr. 23, 1968

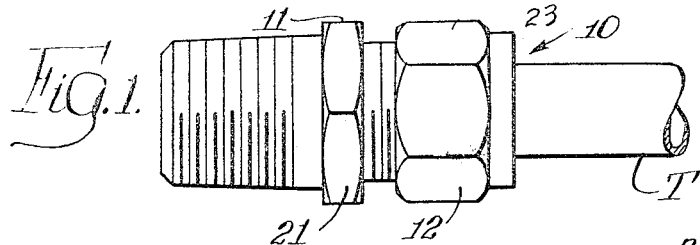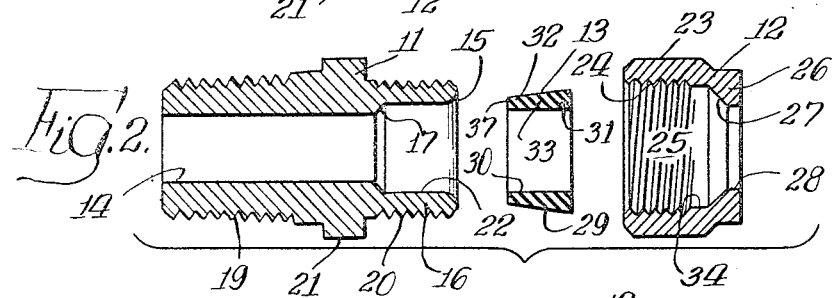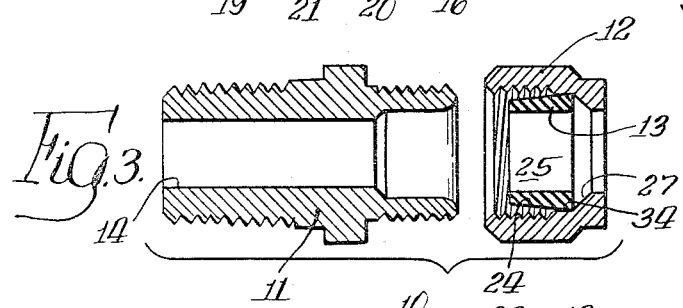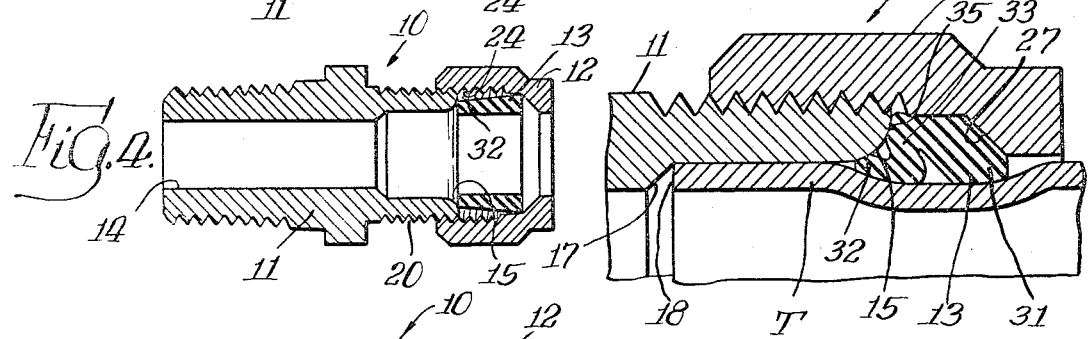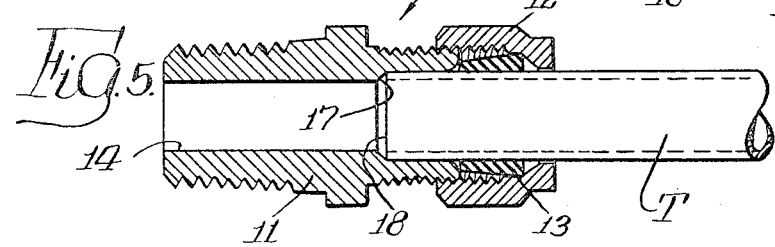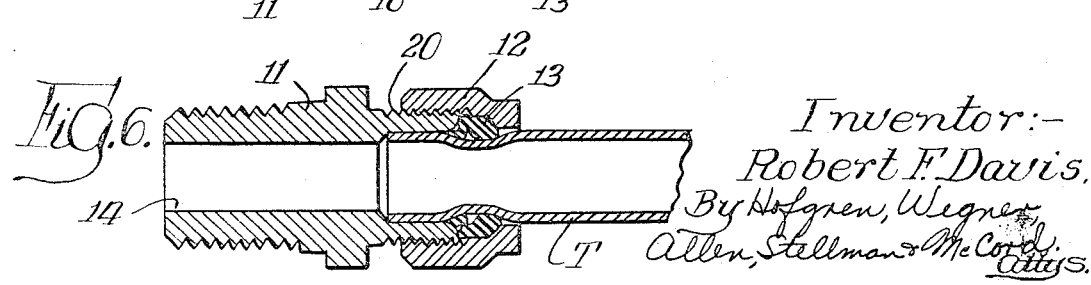

3,379,461
TUBE CONNECTOR
Robert F. Davis, Morton Grove, Ill., assignor to Imperial-Eastman Corporation, a corporation of Illinois
Filed Dec. 23, 1965, Ser. No. 515,938
9 Claims. (Cl. 285—341)

ABSTRACT OF THE DISCLOSURE

A connector for straight ended tubes including a body, a nut and a resilient sleeve which is folded from an original generally tubular configuration to define a pair of V-shaped portions extending generally transversely to the axis of the fitting to maintain an effective sealing of the tube to the fitting body against high vibration forces as well as forces tending to cause movement of the tube relative to the fitting and while effectively minimizing stresses in the tube as a result of such forces. The body includes a camming surface which guides the inner end of the sleeve into an inwardly pointed V-shaped configuration and the nut includes an outer surface which guides the outer end of the sleeve into an outwardly pointed V-shaped configuration.

Background of the invention

This invention relates to tube fittings and in particular to tube connectors.

In one conventional form of tube connector for connecting a straight ended tube, a sleeve is pressed by a nut against a body and cammed thereby into sealing engagement with the tube end. The present invention comprehends an improved tube coupling of this type wherein a compressible resilient sealing sleeve provides improved sealing of the tube end to the body of the connector.

Thus, a principal object of the present invention is the provision of a new and improved tube connector.

Another object of the invention is the provision of such a tube connector having new and improved sealing sleeve means.

A further object of the invention is the provision of such a tube connector wherein the sealing sleeve is caused to define a multiple chevron type seal as a result of make-up of the fitting.

Still another object of the invention is the provision of such a tube connector wherein the sleeve is originally frusto-conical and is deformed during the make-up of the connector to define the multiple chevron configuration.

A further object of the invention is the provision of such a tube connector wherein the sleeve resiliently supports the tubing in an improved manner in the made-up arrangement of the connector.

Still another object of the invention is the provision of such a tube connector including a body having a flow passage opening outwardly through an annular camming surface, a nut having a through bore for coaxially receiving a tube to be sealingly connected to the body, the nut defining in the bore an inwardly facing shoulder aligned with the camming surface, cooperating means on the body and nut for urging the shoulder on the nut coaxially toward the camming surface, and a tubular sleeve coaxially between the camming surface and nut shoulder formed of a deformable material and having an outer end, a mid-portion, an inner end, an axial through bore, and a frusto-conical outer surface narrowing from the outer end to the inner end, the sleeve being deformed by movement of the shoulder toward the camming surface to have the inner end and mid-portion define a first V-shaped fold with the inner end sealingly compressed between the camming surface and the tube and the mid-portion engaging the camming surface at a zone spaced outwardly from the engagement of the inner end with the camming surface, and the mid-portion and outer end define a second V-shaped fold with the outer end extending from the nut to a zone on the tube spaced longitudinally outwardly from the engagement of the mid-portion with the tube.

Thus in summary the invention comprehends an improved fitting wherein a generally tubular resilient sleeve is deformed to define a pair of oppositely facing V-shaped folds disposed between the body camming surface and the nut pressure surface to provide a vibration resistant seal of the tube end to the body.

Other objects and advantages of the invention will be apparent from the following description taken in connection with the accompanying drawing wherein:

FIGURE 1 is a front elevation of a fitting embodying the invention connected to a tube end;

FIGURE 2 is an exploded diametric section thereof;

FIGURE 3 is a view similar to that of FIGURE 2, except that the sleeve is installed within the nut preparatory to the installation of the nut on the body;

FIGURE 4 is a diametric section illustrating the arrangement of the fitting upon initial assembly of the sleeve, nut and body;

FIGURE 5 is a fragmentary diametric section similar to that of FIGURE 4, but with the tube end inserted through the nut and sleeve into the outer end of the body;

FIGURE 6 is a fragmentary diametric section illustrating the arrangement of the fitting and tube end as upon completion of the make-up of the fitting; and FIGURE 7 is an enlarged fragmentary diametric section illustrating the arrangement of the sleeve relative to the nut, body and tube end in the made-up arrangement of the fitting.

In the exemplary embodiment of the invention as disclosed in the drawing, a tube fitting generally designated 10 is shown to comprise a body 11, a nut 12, and a sleeve 13 for sealed connection to a tube end T. As shown in FIGURE 7 of the drawing, the nut 12 cooperates with the body 11 to compress the sleeve 13 into sealed engagement with the tube end T in the made-up condition of the fitting so as to provide an improved resilient connection.

As shown in FIGURE 2, the body 11 defines a through flow passage 14 which opens outwardly through an annular camming surface 15 in the outer end 16 of the body. As shown, camming surface 15 may be arcuate in diametric section. Inwardly of the camming surface 15, the passage 14 is defined by a frusto-conical annular shoulder 17 which serves as a limit stop for the inner tip 18 of the tube end T. The body may be provided with an external inner end thread 19, an external outer end thread 20, and an intermediate plurality of tool engaging flats 21. As seen in FIGURE 2, the outer end portion 22 of the flow passage 14 is diametrically enlarged to receive the tube end T.

The nut 12 is provided with a plurality of external flats 23 and an internal inner end thread 24 defining the inner end portion of a through bore 25 therein. The nut is further provided with an outer flange portion 26 defining a frusto-conical annular shoulder 27 and a cylindrical outer surface 28 at the outer end of the bore 25. Shoulder 27 may be at a substantial angle to the axis of the nut and herein is approximately 45° thereto. As best seen in FIGURE 7, the shoulder 27 is aligned with the camming surface 15 so that when the nut thread 24 is advanced on body thread 20 the shoulder 27 is moved axially toward the camming surface thereby to compress the sleeve 13 therebetween.

Sleeve 13 comprises a tubular member formed of a resilient material such as rubber. As shown in FIGURE 2, the sleeve 13 includes an external frusto-conical surface 29 and a right circular internal surface 30 defining a through bore axially therein. Thus, the outer end 31 of the sleeve is radially thicker than the inner end 32 of the sleeve with the mid-portion 33 thereof being of intermediate thickness. The diameter of surface 30 is preferably only slightly smaller than the outer diameter of the tube end T to permit relatively free movement of the tube end through the sleeve in the initial step of assembly of the fitting on the tube end as shown in FIGURE 5.

To provide facilitated handling of the fitting prior to the make-up thereof, the sleeve 13 is yieldingly mounted within the nut 12, as shown in FIGURE 3. For this purpose, the diameter of the surface 29 at the outer end 31 is made to be slightly larger than a cylindrical bore surface 34 defining the nut bore 25 intermediate the shoulder 27 and the thread 24. In the initial step of make-up of the fitting, the nut thread 24 is advanced over the body thread 20 until the inner end 32 of the sleeve 13 abuts the camming surface 15 of the body, as shown in FIGURE 4. The tube end is then inserted through the thusly assembled fitting 10, as shown in FIGURE 5, until the inner tip 18 abuts the limit shoulder 17 in the body passage 14.

Nut 12 is then further advanced on body thread 20 to compress the sleeve 13 between nut shoulder 27 and camming surface 15. Such forcible compression resiliently deforms the sleeve 13 to define a pair of chevron portions, as best seen in FIGURE 7. More specifically, the outer diameter of the tip 37 of the sleeve inner end 32 is smaller than the outer diameter of the camming surface 15 whereby the inner end 32 of the sleeve is compressed between the camming surface and the wall of the tube T to provide a high compression, effectively positive seal between the tube and the body 11. As shown, the compressive force may radially constrict the tube wall. Mid-portion 33 of the sleeve extends radially outwardly between the tube T and a zone 35 on the camming surface 15 spaced outwardly of the engagement of the sleeve end 32 with the camming surface, whereby the inner end portion 32 and mid-portion 33 of the sleeve define a V-shaped fold, or chevron. The compressive force acting through the sleeve 13 between the shoulder 27 and zone 35 of the camming surface 15 provides an effective seal between the sleeve and the body at zone 35 and permits the V-configuration of the inner end 32 and mid-portion 33 of the sleeve to provide a highly desirable chevron seal functioning.

The outer end 31 of the sleeve is urged forcibly radially inwardly against the tube to define with mid-portion 33 a second V-configuration providing a highly desirable second chevron sealing functioning of the sleeve 13. As shown in FIGURES 6 and 7, the forces generated by the nut against the sleeve in compressing the sleeve between the camming surface and the outer wall of the tube T deforms the tube wall radially inwardly to provide an effectively positive sealed connection of the tube T to the body 11 through the sealing sleeve 13. Thus, the sealing sleeve 13 effectively defines a pair of axially related V-configuration chevron seals resiliently carrying and sealing the tube relative to the body 11.

The fitting 10 may be made up with effectively minimum torque as a result of the improved chevron seal formation. Further, when fluid pressure is applied within the tube T and body passage 14, the pressure tends to further deform the sleeve 13 to enhance the sealing engagement thereof with the tube and body. The improved resilient mounting of the tube by sleeve 13 in the fitting 10 provides an improved vibration-proof connection maintaining effective sealing of the tube to the body against high vibration forces as well as forces tending to cause movement of the tube relative to the fitting while effectively minimizing stresses in the tube as a result of such forces.

The sleeve may be formed of suitable resilient material such as synthetic rubber. The body and nut end may be formed of suitable material such as metal. Thus, the fitting 10 is extremely simple and economical of construction while yet providing the highly desirable positive sealing tube connection functioning as described above.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A fitting comprising:
a body provided with a bore having a diameter substantially equal to the outer diameter of a tube end to be connected thereto and an annular camming surface at an outer end of the bore;
a nut having a through bore for coaxially receiving a tube to be sealingly connected to said body, said nut defining in said bore an annular surface having a diameter substantially larger than the outer diameter of the tube end, and an inwardly facing shoulder axially outwardly of said annular surface and aligned with said camming surface, the inner diameter of said shoulder being substantially equal to the outer diameter of the tube end;
cooperating means on said body and nut for urging said shoulder on said nut coaxially toward said camming surface; and
a tubular sleeve coaxially between said camming surface and nut shoulder formed of a deformable material and having an outer end, a mid-portion, an inner end, an axial through bore having an undeformed internal diameter no greater than the outer diameter of the tube end, and a frusto-conical outer surface widening from said inner end toward said outer end, said sleeve being deformed by movement of said shoulder toward said camming surface to have said inner end and mid-portion define a first V-shaped fold of less than approximately 90° with said inner end sealingly compressed between said camming surface and the tube and said mid-portion engaging said camming surface at a zone spaced outwardly from the engagement of said inner end with said camming surface and abutting said annular nut surface, and said mid-portion and outer end define a second V-shaped fold of less than approximately 90° with said outer end extending from said annular nut surface to a zone on the tube spaced longitudinally outwardly from the engagement of said sleeve inner end with the tube.

2. The fitting of claim 1 wherein the tube is radially constricted by the folded sleeve.

3. The fitting of claim 1 wherein said sleeve bore is right circularly cylindrical.

4. The fitting of claim 1 wherein said outer end of the sleeve is substantially thicker than said inner end of the sleeve.

5. The fitting of claim 1 wherein said nut shoulder extends at an angle of approximately 45° to the axis of the nut to concurrently urge said mid-portion of the sleeve sealingly against said camming surface of the body and urge said outer portion sealingly against the tube.

6. The fitting of claim 1 wherein the undeformed outer diameter of the inner end of the sleeve is smaller than the outer diameter of said camming surface.

7. The fitting of claim 1 wherein the undeformed maximum outer diameter of said outer end of the sleeve is greater than the diameter of said nut annular surface, said outer end being compressively retained within said nut annular surface prior to make-up of the fitting.

8. The fitting of claim 1 wherein said sleeve is formed of a resilient material.

9. The fitting of claim 1 wherein said sleeve is formed of a rubbery material.

References Cited

UNITED STATES PATENTS

| 2,252,920 | 8/1941 | Edelmann | 285—249 X |
| 2,414,995 | 1/1947 | Wurzburger | 285—382.7 X |
| 3,275,350 | 9/1966 | Kody et al. | 285—382.7 X |

FOREIGN PATENTS

| 757,204 | 5/1933 | France. |
| 1,181,844 | 1/1959 | France. |

CARL W. TOMLIN, *Primary Examiner.*

T. F. CALLAGHAN, *Examiner.*